United States Patent [19]

Namiki et al.

[11] Patent Number: 4,903,224
[45] Date of Patent: Feb. 20, 1990

[54] OPTICAL INFORMATION RECORDING DISK

[75] Inventors: Tohru Namiki; Fumio Matsui; Kouji Shimoda, all of Saitama; Yosiaki Fuse, Tokyo, all of Japan

[73] Assignee: Pioneer Electronic Corporation, Tokyo, Japan

[21] Appl. No.: 168,777

[22] Filed: Mar. 16, 1988

[30] Foreign Application Priority Data

Mar. 16, 1987 [JP] Japan .................................. 62-60656
Jun. 19, 1987 [JP] Japan .................................. 62-153063

[51] Int. Cl.4 .................... G11B 17/028; G11B 19/20; G11B 23/00
[52] U.S. Cl. ...................................... 369/290; 369/282
[58] Field of Search ................ 369/289, 290, 291, 292, 369/270, 271, 282

[56] References Cited

U.S. PATENT DOCUMENTS

| | | | |
|---|---|---|---|
| 3,430,966 | 3/1969 | Gregg | 369/284 |
| 4,210,785 | 7/1980 | Huber | 360/12 |
| 4,616,278 | 10/1986 | Yamaguchi et al. | 360/99 |
| 4,658,383 | 4/1987 | Ohta et al. | 369/290 |
| 4,695,910 | 9/1987 | Maruyama et al. | 360/133 |
| 4,785,444 | 11/1988 | Nakane et al. | 369/282 |

FOREIGN PATENT DOCUMENTS

| | | | |
|---|---|---|---|
| 52454 | 5/1982 | European Pat. Off. | |
| 192244 | 8/1986 | European Pat. Off. | |
| 230963 | 5/1987 | European Pat. Off. | 369/290 |
| 240237 | 7/1987 | European Pat. Off. | 369/270 |
| 233644 | 8/1987 | European Pat. Off. | |
| 2482757 | 5/1980 | France. | |
| 54-67411 | 5/1979 | Japan. | |
| 58-41404 | 3/1983 | Japan. | |
| 59-72603 | 4/1984 | Japan. | |
| 61-162878 | 7/1986 | Japan. | |

OTHER PUBLICATIONS

*Revox Compact Disc Player*, Audio, vol. 68, No. 9, Sep. 1984, pp. 50–54.

Primary Examiner—Steven L. Stephan
Attorney, Agent, or Firm—Sughrue, Mion, Zinn, Macpeak & Seas

[57] ABSTRACT

An optical information recording disk having an improved eccentricity and reduced center hole wear. A metal plate lamination hub member is inserted into and fixed in a central hole in the substrate of the disk. The metal plate lamination member is formed of a metal plate and a resin hub member having center holes dimensioned and aligned such that the center hole in the metal plate forms the center hole of the disk. The metal plate and the resin hub member are attached to one another by ultrasonic welding. The metal plate may have a hardened layer at least around its center hole.

10 Claims, 2 Drawing Sheets

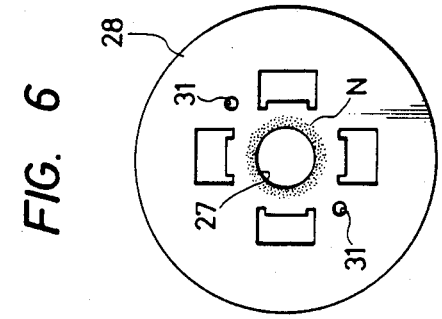
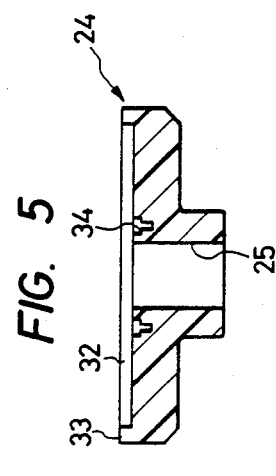
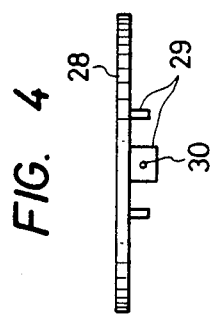
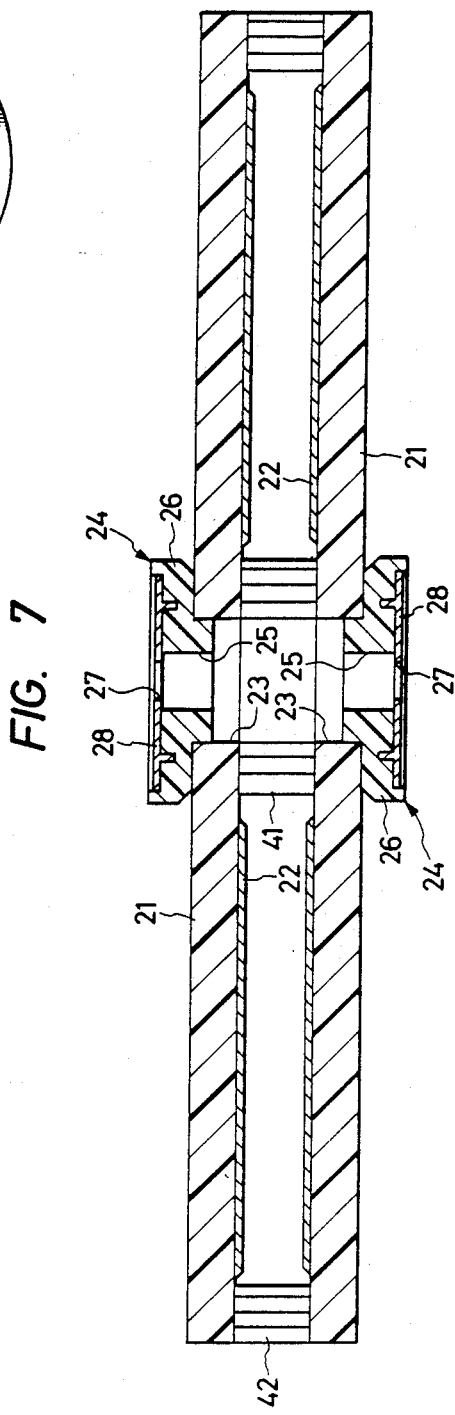

OPTICAL INFORMATION RECORDING DISK

BACKGROUND OF THE INVENTION

The present invention relates to an optical information recording disk such as a write-once type optical disk, a rewritable type optical disk, and the like.

In a conventional optical information recording disk such as a write-once type optical disk, a transparent plastic plate is used as the substrate of the disk, and a recording layer, which is made of an organic pigment film, is formed on one surface of the disk substrate using a spin coating method or the like. A groove for guiding a light beam spot is formed in the recording surface. Information is recorded along the groove.

Information is recorded on the disk by causing a recording light beam spot to move along the guide groove. The guide groove is formed in a concentric or spiral pattern with a pitch between adjacent grooves of a small value such as 1.6 $\mu$m. The alignment of the guide groove with the rotational center of the disk is critical in making the light beam spot accurately follow the guide groove correctly and stably.

In making the rotational center of the disk correspond to the center of the groove, the circularity of the center hole in the disk is an important factor. The center hole in conventional disks has been formed in a central portion of the plastic disk substrate by cutting, punching, or the like during the injection molding process. These techniques do not, however, consistently produce center holes with the desired degree of circularity.

In order to overcome this problem, there has been proposed an optical disk having a structure, as shown in FIG. 1, in which a hub member 4 formed of a lamination of metal plates is fitted into a center hole 3 in a disk substrate 1. The metal plate lamination hub member 4 is constituted by a resin hub member 6 having a center hole 8, and a metal plate 5 affixed to a flat surface of the hub member 6 and having a center opening 7 which acts as the center hole of the optical disk. Because the center hole which forms the center hole of the optical disk is formed by drilling, it can have an excellent circularity, and hence the eccentricity of the disk is significantly reduced. Moreover, use of the metal plate makes it possible to employ a magnetic clamper mechanism for clamping the disk on the turntable. In such a case, it is unnecessary to use in the clamper mechanism any member which presses the disk from the upper side thereof, thus making it possible to reduce the overall height of the recording/reproducing apparatus.

However, in the metal plate lamination hub member, the metal plate and the resin hub are a combination of an inorganic member and an organic member. It is of course difficult to join such dissimilar members with a high adhesive strength. Accordingly, there is a problem in that sometimes the components of the metal plate lamination hub member separate, causing failure of the hub member.

Furthermore, the metal plate used in the metal plate lamination hub member has been made of a stainless steel material, which is magnetic and resistant to rust. However, stainless steel typically has a Vickers hardness of only about 200, and hence the metal plate is relatively soft. Since the spindle is repeatedly inserted into the common center hole of the metal plate of the stainless steel plate and the resin hub member, there is a tendency for the outer diameter of the center hole in the metal plate to be enlarged irregularly, and hence the degree of circularity of the center hole in the metal plate is reduced.

SUMMARY OF THE INVENTION

Therefore, it is an object of the present invention to eliminate the drawbacks mentioned above.

More specifically, it is an object of the present invention to provide an optical information recording disk in which separation of a metal plate and a resin hub member in a metal plate lamination member is positively prevented.

It is another object of the present invention to provide an optical information recording disk in which the wear resistance of the metal plate of the metal plate lamination hub member is improved.

In accordance with the above and other objects, the invention provides an optical information recording disk comprising a recording layer formed on one surface of the disk with a center hole formed in the central portion of the disk and with a metal plate lamination member being fitted in and fixed to the center hole in the disk. The metal lamination plate member is constituted by a metal plate and a resin hub member. The metal plate and the resin hub member having respective center holes communicated with each other such that the center positioning of the optical disk is carried out with respect to the center hole of the metal plate. The metal plate and the resin hub member are affixed to each other by ultrasonic welding. Further, the metal plate may be provided with a hardened layer surrounding the center hole of the metal plate so that the center hole of the metal plate is prevented from wearing due to abrasion with the spindle holding the disk during recording/reproduction.

BRIEF DESCRIPTION OF THE DRAWINGS

FIG. 4 is a side view of the metal plate;

FIG. 5 a cross-sectional view of the resin hub member; and

FIG. 6 is a plan view of a modified metal plate which may be used in the practice of the invention.

FIG. 7 is a cross-sectional view of a double-sided optical information recording disk constructed in accordance with the present invention.

DESCRIPTION OF THE PREFERRED EMBODIMENTS

Preferred embodiments of the invention will now be described with reference to FIGS. 2 through 6 of the accompanying drawings.

Figure 1:
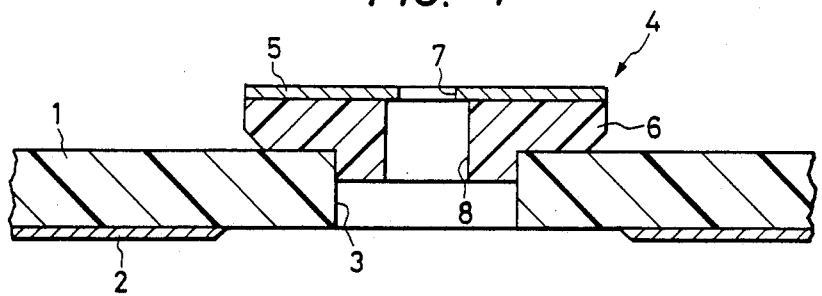
FIG. 1 is a cross-sectional view of a conventional optical information recording disk.
Figure 2:
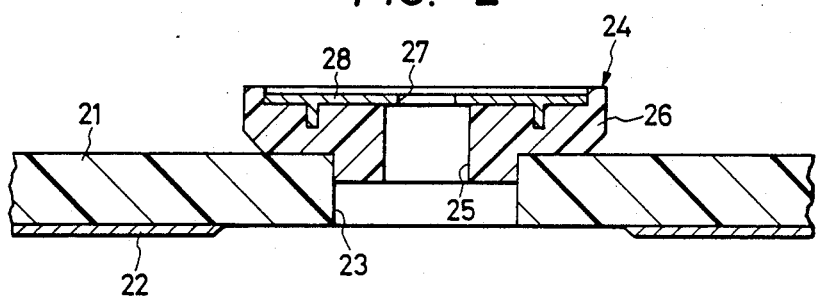
FIG. 2 is a cross-sectional view of an optical information recording disk constructed in accordance with the present invention.

In FIG. 2, reference numeral 21 designates a disk substrate constructed of a transparent plastic plate and having a recording film 22 formed on one surface thereof. A metal plate lamination hub member 24 is fitted into a center hole 23 formed in the central portion of the substrate 21 and fixedly secured thereto by an adhesive agent, ultrasonic welding method or the like. The metal plate lamination member 24 is constituted by a resin hub member 26 and a circular metal plate 28. The hub member 26 is composed of a circular plate portion having a center hole 25 and a cylindrical projecting portion surrounding the center hole 25. The circular metal plate 28 is fixed in a recess formed in one surface of the hub member 26 by ultrasonic welding. A small circular hole 27, which will be used as the center hole of the optical disk, is formed in the circular metal plate.

Figure 3:
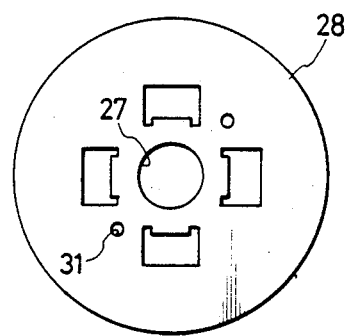
FIG. 3 is a plan view of a metal plate used in the optical disk of FIG. 2.

The metal plate 28 is made of a stainless steel such as SUS 430, which is a magnetic material and resistant to rust, and the small circular hole 27 is formed in the central portion of the metal plate 28, as shown in FIGS. 3 and 4. The inner diameter of the small hole 27 is made smaller than that of the center hole 25 of the resin hub member 26 so that the small circular hole 27 will act as the center hole for the driving of the optical disk. A plurality of protrusions 29 are equidistantly arranged around the small circular hole 27 by punching. A small hole 30 is formed in each of the protrusions 29. A plurality of guide holes 31 used for positioning are equidistantly formed in the metal plate 28.

As shown in FIG. 2, the resin member 26 is formed so that the outer diameter of its circular flat portion is larger than the inner diameter of the center hole 23 of the disk substrate 1, and the outer diameter of its cylindrical projecting portion is determined such that the cylindrical projecting portion fits into the center hole 23. As shown in FIG. 5, an annular recess 32 is formed in one surface of the circular flat surface so that the circular metal plate 28 is fitted into the recess 32, and an annular projecting portion 33 is formed in the periphery of the recess 32. The inner diameter of the recess is made slightly smaller than the outer diameter of the metal plate 28. Engagement holes 34 are formed in the recess 32 in such a manner that the protrusions 29 of the metal plate 28 can be inserted into respective ones of the engagement holes 34. Each of the engagement holes 34 is slightly larger at its inlet portion and smaller at its bottom portion than the respective protrusion 29. Through-holes corresponding in position to the holes 31 of the metal plate 28 are formed in the hub member.

To join the circular metal plate 28 and the resin hub member 26, after guide pins are passed through the guide holes 31 and the above-mentioned through-holes to achieve correct positioning between the circular metal plate 28 and the resin hub member 26, the metal plate 28 is ultrasonically pressed into the recess portion 32 of the hub member 26 and the protrusions 29 are ultrasonically pressed into the corresponding engagement holes 34. In the pressing process, the circumferential edge portion of the metal plate 28 is ultrasonically welded to the inside portion of the annular projecting portion 33 of the hub member 24 and the protrusions 29 are ultrasonically welded in the engagement holes 34 at the circumferential portion of the metal plate 28. In this process, resin flows and enters the small holes 30 and is then fused so that the protrusions 29 and the hub member 24 are firmly fixed to each other.

Thus, the metal plate 28 is welded at its outer circumferential portion to the resin hub member 26 and further welded to the latter at its inner circumferential portion through the plural protrusions 29. As a result, the metal plate 28 and the resin hub member 26 are positively prevented from separating from one another in both the axial and rotational directions.

Since the relative positioning between the metal plate 28 and the resin hub member 26 for the ultrasonic welding process is carried out not with their center holes but with the guide holes 31 and the through-holes, the center hole 27 of the metal plate is protected from damage.

Moreover, since the inlet portion of each of the engagement holes 34 formed in the resin hub member 26 into which the protrusions 29 of the metal plate are inserted are made wide, excess resin created during the ultrasonic pressing process will flow into the engagement holes 34 and accumulate in the wide inlet portions of the engagement holes 34, and hence there is no reduction in the welding strength due to rising of the metal plate caused by excess resin.

The shape of the protrusions 29 of the metal plate 28 can be variously modified. For example, in order to facilitate the insertion of the protrusions 29 during the pressing process, the protrusions 29 may be formed with angled tip ends. Also, a taper portion may be formed on the resin hub member 24 at its edge portion on the side of the recess in order to guide the metal plate 28 while the metal plate 28 is being pressed into the recess 32. Further, the metal plate 28 may be subjected to, for example, nitriding processing to raise its surface hardness for the purpose of preventing the circularity of the center hole of the disk from being distorted due to abrasion during recording or reproduction.

As shown in FIG. 6, a hardened layer N may be formed by nitriding processing of at least the periphery of the center hole 27 of the metal plate 28 to thereby improve the wear resistance of the peripheral portion of the metal plate 28 in the region around the center hole 27. The hardness of the layer N may be made substantially the same as that of the spindle (typically about 1,000 in Vickers hardness). If desired, the nitriding processing may be performed not only at the periphery of the center hole 27 but also over the entire metal plate 28.

Since at least the periphery of the center hole 27 of the metal plate 28 is subjected to hardening processing so as to form the hardened layer N having a Vickers hardness of about 1000, which is substantially the same as the Vickers hardness of the spindle, wear of the center hole of the disk is reduced. Typically, it has been found that the amount of enlargement of the center hole 27 due to wear is only about 2 $\mu$m after inserting and removing the disk from the spindle 2000 times. If no such hardening processing is employed, the amount of enlargement has been found to be about 11 to 15 $\mu$m under the same conditions.

Also, as shown in FIG. 7, a double-sided disk may be formed by preparing two disks as described above and combining them through an inner annular spacer 41 and an outer annular spacer 42. Each spacer is fixed to the substrate 21 by an adhesive agent or ultrasonic welding method. Moreover a recording film may be provided on only one of the disk substrates. Also, a metal plate lamination member may be provided on only one of the disk substrates.

As described above, in the optical information recording disk of the present invention, the metal plate lamination hub member is constituted by a metal plate and a resin hub member which are affixed to one another using ultrasonic pressure welding. As a result, separation of the metal plate and the resin hub member, both in the axial direction and in the rotational direction, is positively prevented.

Moreover, in the optical information recording disk according to a second aspect of the invention, a hardened layer is formed at the periphery of the center hole of the metal plate by nitriding processing. Thus, because the amount of wear due to abrasion with the hub is significantly reduced, a high degree of circularity of the disk-driving center hole is maintained.

What is claimed is:

1. An optical information recording disk comprising:
 a disk substrate having a recording layer formed on at least one surface thereof and having a center hole formed in a central position thereof; and
 a metal plate lamination member inserted into and fixed in said center hole of said substrate, said metal plate lamination member comprising a metal plate and a resin hub member, said metal plate and said resin hub member having respective center holes communicated with one another in an axial direction in such a manner that center positioning of said disk is effected by engaging the spindle with said center hole in said metal plate; wherein said metal plate has as plurality of protrusions equidistantly spaced therearound and extending in said axial direction, said protrusions being ultrasonically pressed into said resin hub member and welded thereto so as to adhere said metal plate to said resin hub member, wherein said protrusions are bent downward from a plane of said metal disk and have small holes formed in end portions thereof, wherein when said metal plate is ultrasonically welded to said hub, resin flows into said small holes to further secure said metal plate to said hub member.

2. The optical information recording disk of claim 1, wherein said metal plate is made of material which is magnetic and resistant to rust.

3. The optical information recording disk of claim 1, wherein a plurality of protrusions are formed in said metal plate for receiving said protrusions.

4. The optical information recording disk of claim 1, wherein said resin hub member comprises:
 a flat plate portion and a cylindrical projecting portion projecting from one side of said flat plate portion, an outer diameter of said circular flat plate portion being larger than an inner diameter of said center hole of said substrate, and an outer diameter of said cylindrical projecting portion being dimensioned to fit into said center hole of said substrate;
 an annular recess portion formed in said flat plate portion on a side thereof opposite said one side;
 an annular projecting portion surrounding said annular recess portion, an inner diameter of said annular recess portion being slightly smaller than an outer diameter of said metal plate, said plurality of engagement holes being formed in said flat plate portion within said recess portion for receiving respective ones of said protrusions, each of said engagement holes being slightly larger at an inlet portion thereof than at a bottom portion thereof.

5. The optical information recording disk of claim 4, wherein said metal plate has a plurality of guide holes formed therein, and said resin hub member has formed therein through-holes corresponding to said guide holes.

6. The optical information recording disk of claim 1, wherein said metal plate has a hardened layer surrounding said center hole in said metal plate to reduce abrasion wear of said metal plate.

7. The optical information recording disk of claim 6, wherein said hardened layer is formed by a nitriding process.

8. The optical information recording disk of claim 6, wherein said hardened layer extends over the surface of said metal plate.

9. The optical information recording disk of claim 6, wherein said hardened layer has a Vickers hardness of approximately 1000.

10. The optical information recording disk, comprising:
 a pair of disk substrates, at least one of said disk substrates having a recording layer formed on at least one surface thereof and having a center hole formed in a central portion thereof; at least one metal plate lamination member inserted into and fixed in said center hole, said metal plate lamination member comprising a metal plate and a resin hub member, said metal plate and said resin hub member having respective center holes communicated with one another in an axial direction in such a manner that center positioning of said disk is effected by engaging said spindle with said center hole in said metal plate, said metal plate and said resin hub member being fixedly attached together by ultrasonic welding; an inner annular spacer; and an outer annular spacer, said pair of disk substrates being fixed to each other through said inner annular spacer and said outer annular spacer, wherein said metal plate has a plurality of protrusions equidistantly spaced therearound and extending in said axial direction, said protrusions being ultrasonically pressed into said resin hub member and welded thereto so as to adhere said metal plate to said resin hub member, wherein said protrusions are bent downward from a plane of said metal disk and have small holes formed in end portions thereof, wherein when said metal plate is ultrasonically welded to said hub, resin flows into said small holes to further secure said metal plate to said hub member.

* * * * *